(12) United States Patent
Linnell et al.

(10) Patent No.: US 10,589,428 B1
(45) Date of Patent: Mar. 17, 2020

(54) AUTOMATIC DISTRIBUTION OF CONTROL FUNCTIONS BETWEEN MULTIPLE KNOB CONTROLLERS BASED ON PROXIMITY AND RELATIVE POSITIONING OF THE KNOBS

(71) Applicant: Verily Life Sciences LLC, Mountain View, CA (US)

(72) Inventors: Jeffrey Linnell, Woodside, CA (US); Kendra Byrne, San Francisco, CA (US); Matthew Bitterman, San Francisco, CA (US); Tobias Kinnebrew, San Francisco, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 696 days.

(21) Appl. No.: 14/872,531

(22) Filed: Oct. 1, 2015

(51) Int. Cl.
*B25J 13/02* (2006.01)
*B25J 13/00* (2006.01)

(52) U.S. Cl.
CPC ............. *B25J 13/006* (2013.01); *B25J 13/02* (2013.01); *Y10S 901/02* (2013.01)

(58) Field of Classification Search
CPC ................................ B25J 13/006; B25J 13/02
See application file for complete search history.

(56) References Cited

U.S. PATENT DOCUMENTS

| 5,004,391 A | 4/1991 | Burdea |
| 5,587,937 A | 12/1996 | Massie et al. |
| 6,833,846 B2 | 12/2004 | Hasser |
| 7,729,804 B2 * | 6/2010 | Matsumoto ............ B25J 9/1669 700/19 |
| 7,818,910 B2 * | 10/2010 | Young ..................... F41C 23/16 42/106 |

(Continued)

FOREIGN PATENT DOCUMENTS

JP 2005068935 A 3/2005

OTHER PUBLICATIONS

Badescu, Mircea; Wampler, Charles; Mavroidis, Constantino; "Rotary Haptic Knob for Vehicular Instrument Controls"; Proceedings of the 10th Symp. On Haptic Interfaces for Virtual Envir. & Teleoperator Systs. (HAPTICS'02); 2002; IEEE.

(Continued)

*Primary Examiner* — Patrick H Mackey
(74) *Attorney, Agent, or Firm* — McDonnell Boehnen Hulbert & Berghoff LLP

(57) ABSTRACT

Example implementations may relate to methods and systems for determining operational modes for a particular arrangement of controllers. Accordingly, a computing device may detect that a first controller is within a threshold distance of a second controller. Responsively, the device may determine a spatial arrangement of the first and second controllers. The device may then determine a set of operational modes that corresponds to the spatial arrangement, where the set includes (i) a first operational mode that corresponds to a first location in the spatial arrangement and (ii) a second operational mode that corresponds to a second location in the spatial arrangement. The device may then load (i) the first operational mode to whichever of the first and second controllers is in the first location and (ii) the second operational mode to whichever of the first and second controllers is in the second location.

20 Claims, 18 Drawing Sheets

(56) References Cited

U.S. PATENT DOCUMENTS

| | | | |
|---|---|---|---|
| 7,931,535 B2* | 4/2011 | Ikeda | A63F 13/24 345/156 |
| 8,308,563 B2* | 11/2012 | Ikeda | A63F 13/06 463/36 |
| 8,313,379 B2* | 11/2012 | Ikeda | A63F 13/235 345/158 |
| 8,531,392 B2 | 9/2013 | Branton et al. | |
| 8,651,952 B2* | 2/2014 | Dohta | A63F 13/213 463/36 |
| 8,870,653 B2* | 10/2014 | Yamashita | A63F 13/213 463/36 |
| 9,069,396 B2 | 6/2015 | Adler et al. | |
| 2002/0036622 A1 | 3/2002 | Jaeger | |
| 2004/0257339 A1 | 12/2004 | Takahashi | |
| 2007/0236450 A1 | 10/2007 | Colgate et al. | |
| 2009/0009491 A1 | 1/2009 | Grivna | |
| 2011/0071675 A1 | 3/2011 | Wells | |
| 2014/0035736 A1* | 2/2014 | Weddle | G05D 1/005 340/407.2 |
| 2014/0247119 A1 | 9/2014 | Robbins | |
| 2014/0358284 A1 | 12/2014 | Laurent | |
| 2014/0371912 A1* | 12/2014 | Passot | G06N 3/049 700/264 |
| 2015/0190925 A1* | 7/2015 | Hoffman | B25J 9/161 700/257 |
| 2016/0089212 A1 | 3/2016 | Balicki et al. | |
| 2016/0256967 A1* | 9/2016 | Kell | B23Q 1/0036 |

OTHER PUBLICATIONS

Kickstarter, "SPIN remote—The Simplest, most Stylish remote ever", Dec. 2, 2014, <https://www.kickstarter.com/projects/spinremotelspin-remote-the-simplest-most-personal-remote-ever>.

* cited by examiner

AUTOMATIC DISTRIBUTION OF CONTROL FUNCTIONS BETWEEN MULTIPLE KNOB CONTROLLERS BASED ON PROXIMITY AND RELATIVE POSITIONING OF THE KNOBS

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to a computing device that can detect when two or more controllers are within a threshold distance of one another. When the computing device does so, the computing device could then responsively determine a spatial arrangement of the controllers. With such an implementation, the computing device could then determine a set of operational modes that corresponds to the spatial arrangement. Each operational mode in the set may correspond to a particular location within the spatial arrangement. As such, the computing device may then load each respective operational mode of the set to the respective controller in the spatial arrangement that is located at the location corresponding the respective operational mode. Once the operational modes have been loaded, each controller in the spatial arrangement could then essentially operate (e.g., via the computing device) a different aspect of a robotic system (or of a robotic system component).

In one aspect, a method is disclosed. The method involves detecting, by a computing device, that a first controller is within at least a threshold distance of a second controller, where the first and second controllers are each configurable to operate at least one component of a robotic device. The method also involves, in response to at least the detecting, determining a spatial arrangement of the first and second controllers. The method additionally involves determining a set of operational modes that corresponds to the spatial arrangement, where the set comprises at least (i) a first operational mode that corresponds to a first location in the spatial arrangement and (ii) a second operational mode that corresponds to a second location in the spatial arrangement. The method further involves the computing device loading (i) the first operational mode to whichever of the first and second controllers is in the first location in the spatial arrangement and (ii) the second operational mode to whichever of the first and second controllers is in the second location in the spatial arrangement.

In another aspect, a non-transitory computer readable medium is provided. The non-transitory computer readable medium has stored therein instructions executable by one or more processors to cause a computing device to perform functions. The functions include detecting that a first controller is within at least a threshold distance of a second controller, where the first and second controllers are each configurable to operate at least one component of a robotic device. The functions also include, in response to at least the detecting, determining a spatial arrangement of the first and second controllers. The functions additionally include determining a set of operational modes that corresponds to the spatial arrangement, where the set comprises at least (i) a first operational mode that corresponds to a first location in the spatial arrangement and (ii) a second operational mode that corresponds to a second location in the spatial arrangement. The functions further include loading (i) the first operational mode to whichever of the first and second controllers is in the first location in the spatial arrangement and (ii) the second operational mode to whichever of the first and second controllers is in the second location in the spatial arrangement.

In yet another aspect, a computing system is provided. The computing system includes one or more processors. The computing system also includes a non-transitory computer readable medium. The computing system additionally includes program instructions stored on the non-transitory computer readable medium and executable by the one or more processors to: detect that a first controller is within at least a threshold distance of a second controller, where the first and second controllers are each configurable to operate at least one component of a robotic device. The program instructions are also executable to, in response to at least the detecting, determine a spatial arrangement of the first and second controllers. The program instructions are additionally executable to determine a set of operational modes that corresponds to the spatial arrangement, where the set comprises at least (i) a first operational mode that corresponds to a first location in the spatial arrangement and (ii) a second operational mode that corresponds to a second location in the spatial arrangement. The program instructions are further executable to load (i) the first operational mode to whichever of the first and second controllers is in the first location in the spatial arrangement and (ii) the second operational mode to whichever of the first and second controllers is in the second location in the spatial arrangement.

In yet another aspect, a system is provided. The system may include means for detecting that a first controller is within at least a threshold distance of a second controller, where the first and second controllers are each configurable to operate at least one component of a robotic device. The system may also include means for, in response to at least the detecting, determining a spatial arrangement of the first and second controllers. The system may additionally include means for determining a set of operational modes that corresponds to the spatial arrangement, where the set comprises at least (i) a first operational mode that corresponds to a first location in the spatial arrangement and (ii) a second operational mode that corresponds to a second location in the spatial arrangement. The system may further include means for loading (i) the first operational mode to whichever of the first and second controllers is in the first location in the spatial arrangement and (ii) the second operational mode to whichever of the first and second controllers is in the second location in the spatial arrangement.

These as well as other aspects, advantages, and alternatives will become apparent to those of ordinary skill in the art by reading the following detailed description, with reference where appropriate to the accompanying drawings.

DETAILED DESCRIPTION

Figure 1A:
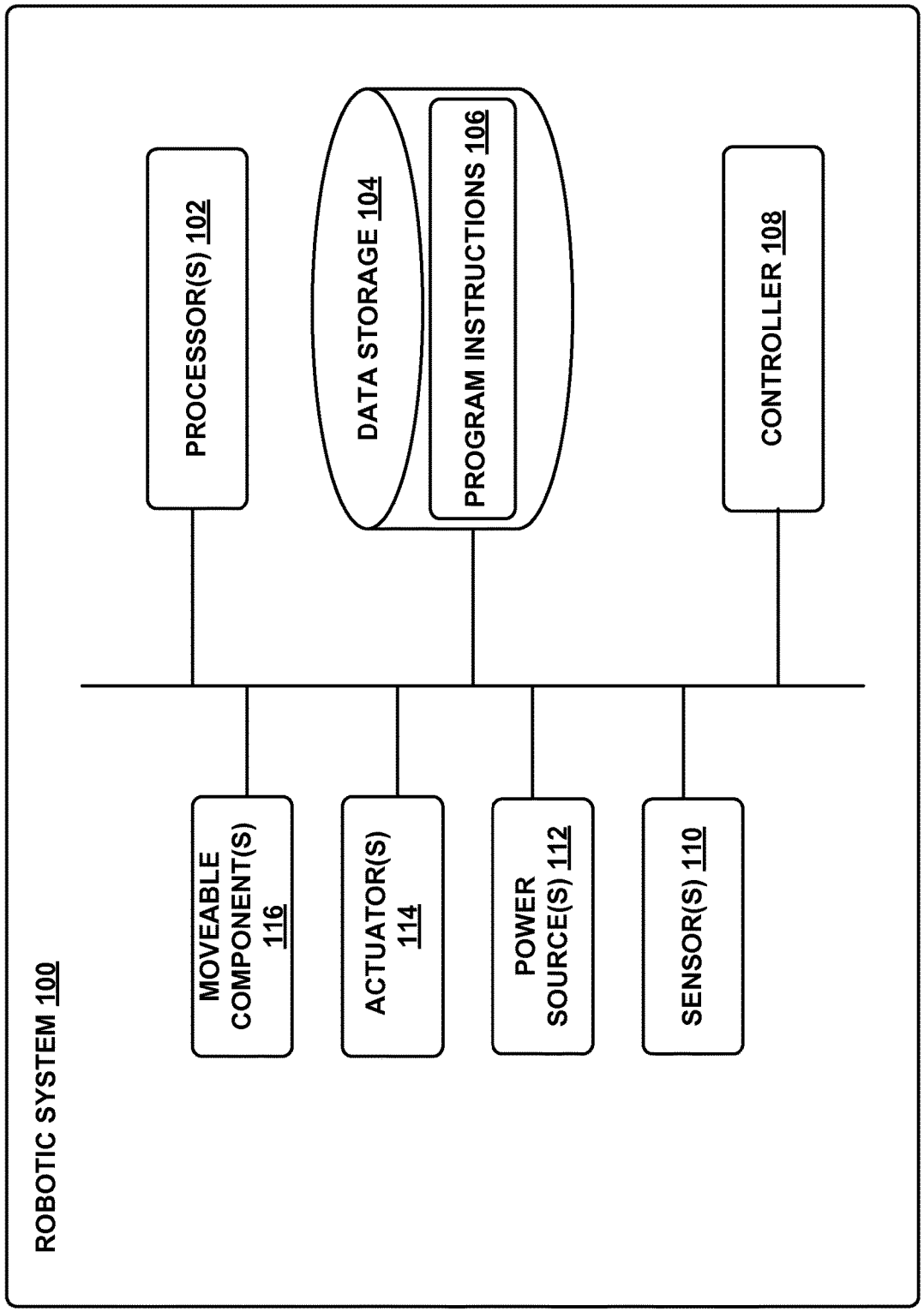
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for automatically loading operational modes for two or more controllers based on a spatial arrangement of the controllers. In particular, example controllers may each include a rotatable knob and touch sensors coupled to the rotatable knob. Rotation of knob and touch data received from the touch sensors may collectively generate output data that represents intended control actions provided by a user. Further, each controller may include a motor that is configured to generate torque on the knob, so as to provide haptic feedback via the knob.

A computing device, such as a tablet, may receive the output data from each such controller and may interpret the output data to determine specific intended operations of a robotic system. Upon processing the output data to determine a particular interpretation, the computing device may send commands to the robotic system in order to cause the robotic system to carry out intended operations of various components such as actuators coupled to joints, end effectors, appendages, speakers, and/or light sources, among others.

Accordingly, two or more such controllers could be placed in a particular spatial arrangement, such as a linear spatial arrangement for instance. The computing device could detect that these controllers have a particular spatial arrangement, and responsively load a set of operational modes to the controllers that corresponds to the particular spatial arrangement. Various types of spatial arrangements could be mapped to such sets of operational modes. For instance, a computing device could detect a particular spatial arrangement of controllers when the controllers are located within a certain distance from one another, when the spatial arrangement of the controllers has a particular shape/form with respect to one another and/or other devices (e.g., a tablet or robotic device that is being controlled), and/or when the controllers have certain orientations relative to one another and/or other devices, among others.

Once the computing device detects a particular spatial arrangement, the computing device may determine the particular set of operational modes for the controllers, which corresponds to the particular spatial arrangement. For example, each operational mode of an example set could correspond to operation of a different aspect of the robotic system (or of a robotic system component). To determine which set corresponds to a detected spatial arrangement of controllers, the computing device could, for instance, refer to a table that maps various sets of operational modes to corresponding spatial arrangements.

In a further aspect, each operational mode in a given set could correspond to a certain location within the corresponding spatial arrangement of controllers. As such, the computing device may load each operational mode to the controller that is located at the corresponding location in the spatial arrangement. In this manner, the computing device could cause each respective controller in the spatial arrangement to operate a different aspect of a robotic system (or of a robotic system component).

By way of example, the computing device could detect that three controllers have been placed in a substantially linear arrangement, are all within some threshold distance from one another (e.g., so the distance between the two controllers that are furthest from one another is less than some threshold distance), and that the arrangement is within some threshold distance from a robotic device. (Note that the threshold distance to the robotic device could be the same as or different from the threshold distance between controllers.) When this spatial arrangement is detected, a tablet being used a control device could responsively load a set of operational modes to the three controllers that: (i) cause the left-most controller within the arrangement (e.g., left as perceived by a user facing the robotic system and having the controllers located between the user and the robotic system) to operate rotation of a joint of the robotic system about an x-axis, (ii) cause the right-most controller within the arrangement (e.g., right as perceived by the same user) to operate rotation of the joint about a y-axis, and (iii) cause the center controller within the arrangement to operate rotation of the joint about a z-axis. Other examples are also possible.

II. ILLUSTRATIVE SYSTEMS

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
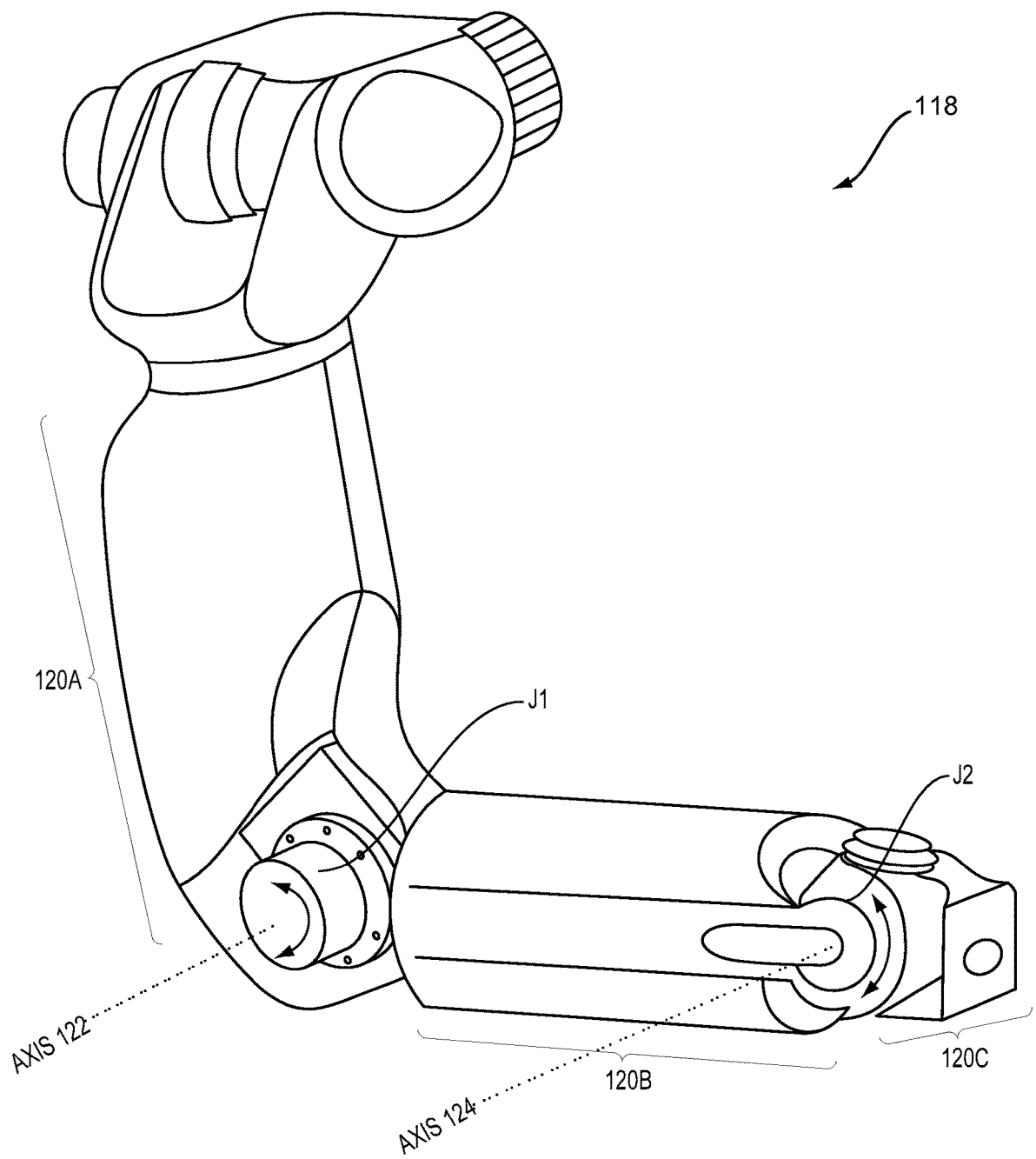

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
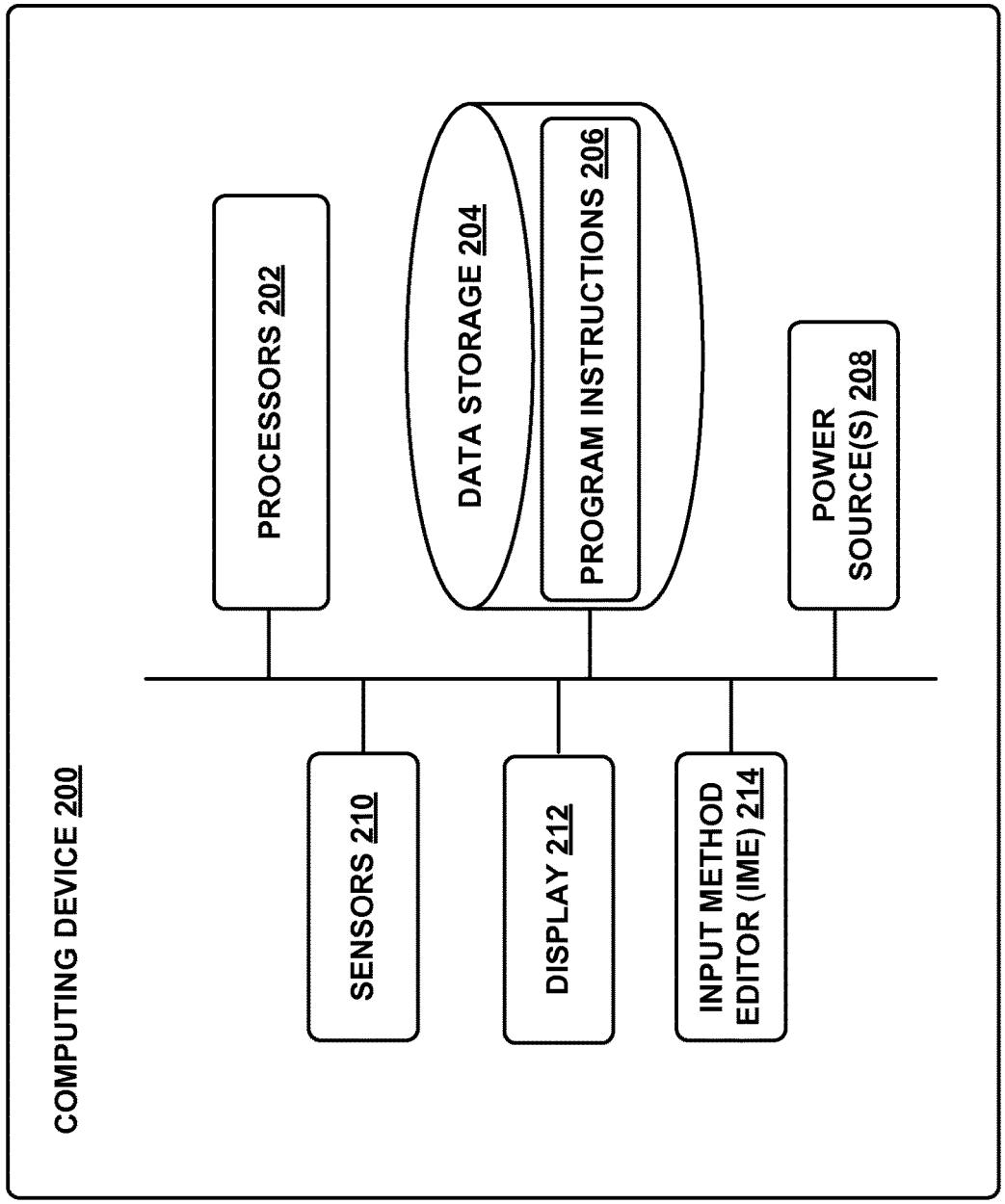
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
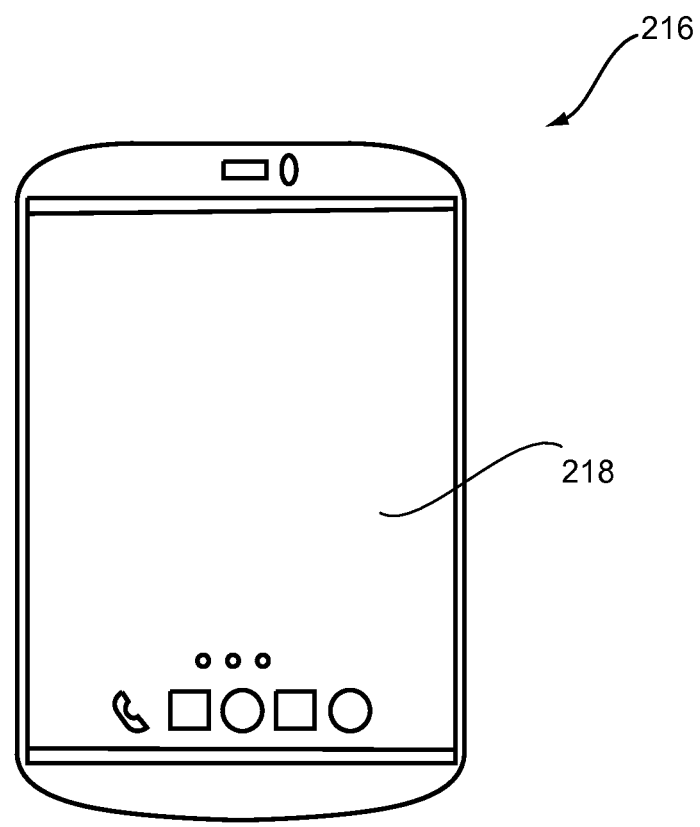

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
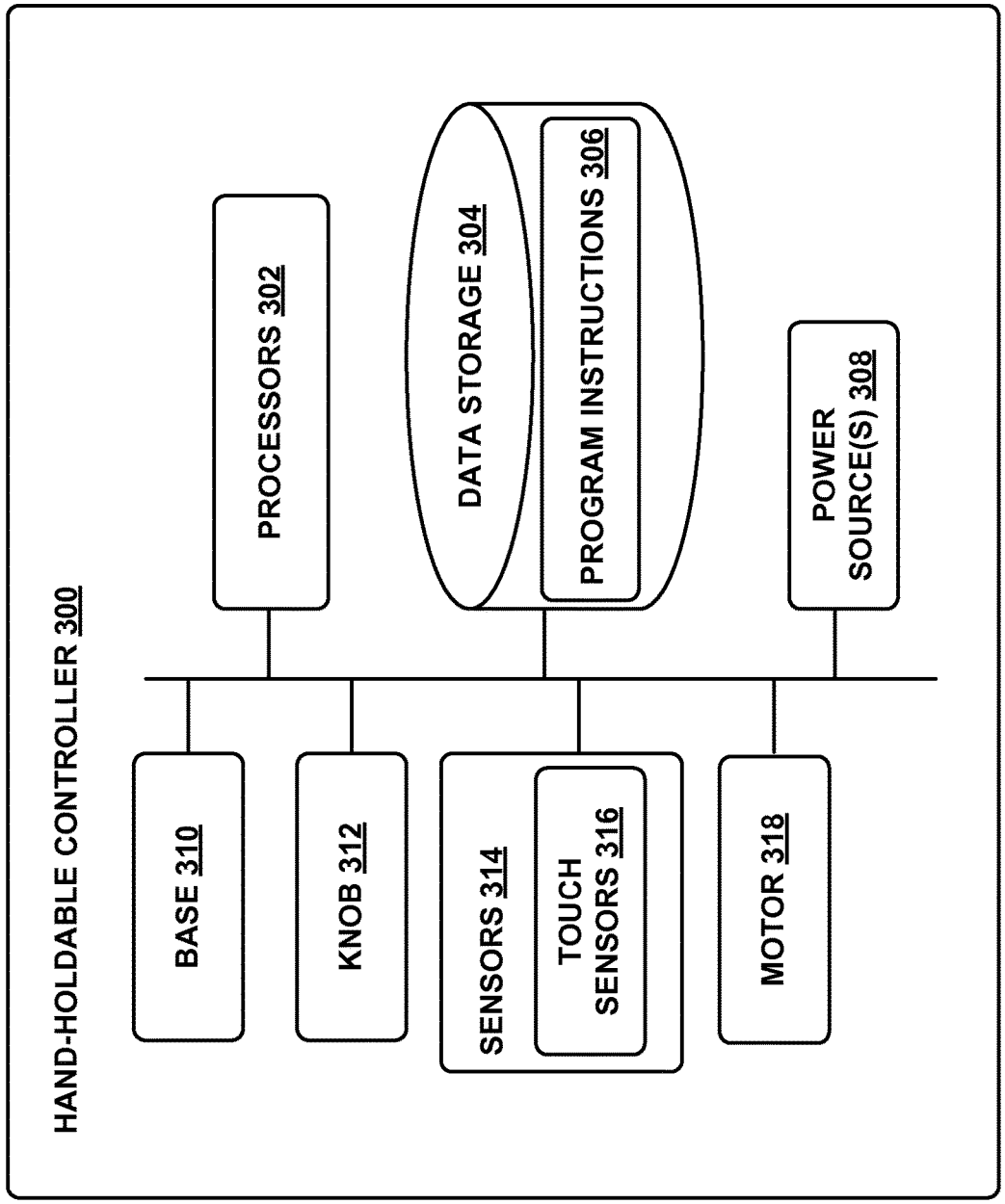
FIGS. 3A, 3B, 3C, and 3D illustrate an example handholdable controller, according to an example implementation.
Figure 3B:
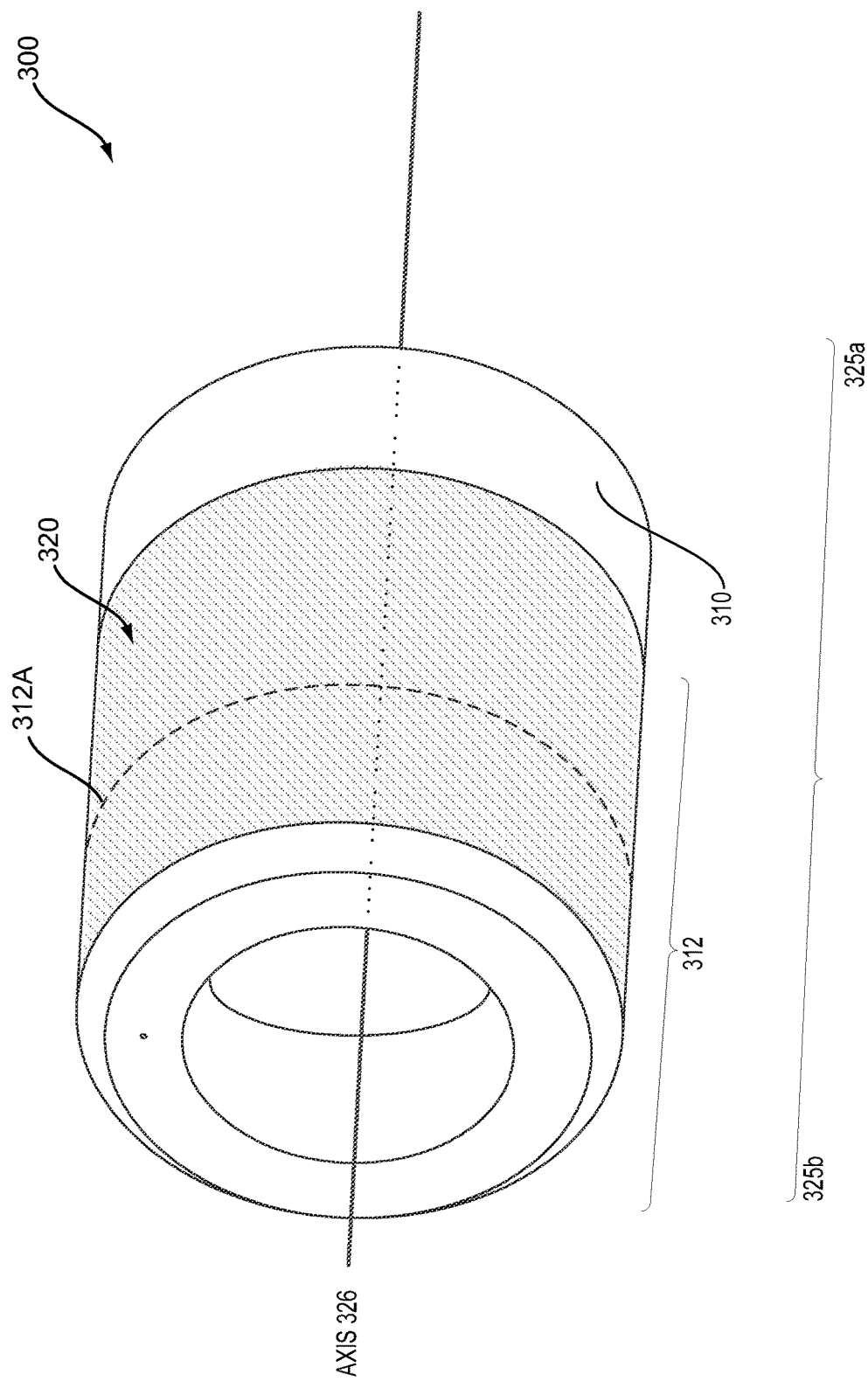

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply torque-generating force to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque-generating force to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C to 3D showing different hand positions on the example hand-holdable controller 300.

Figure 3C:
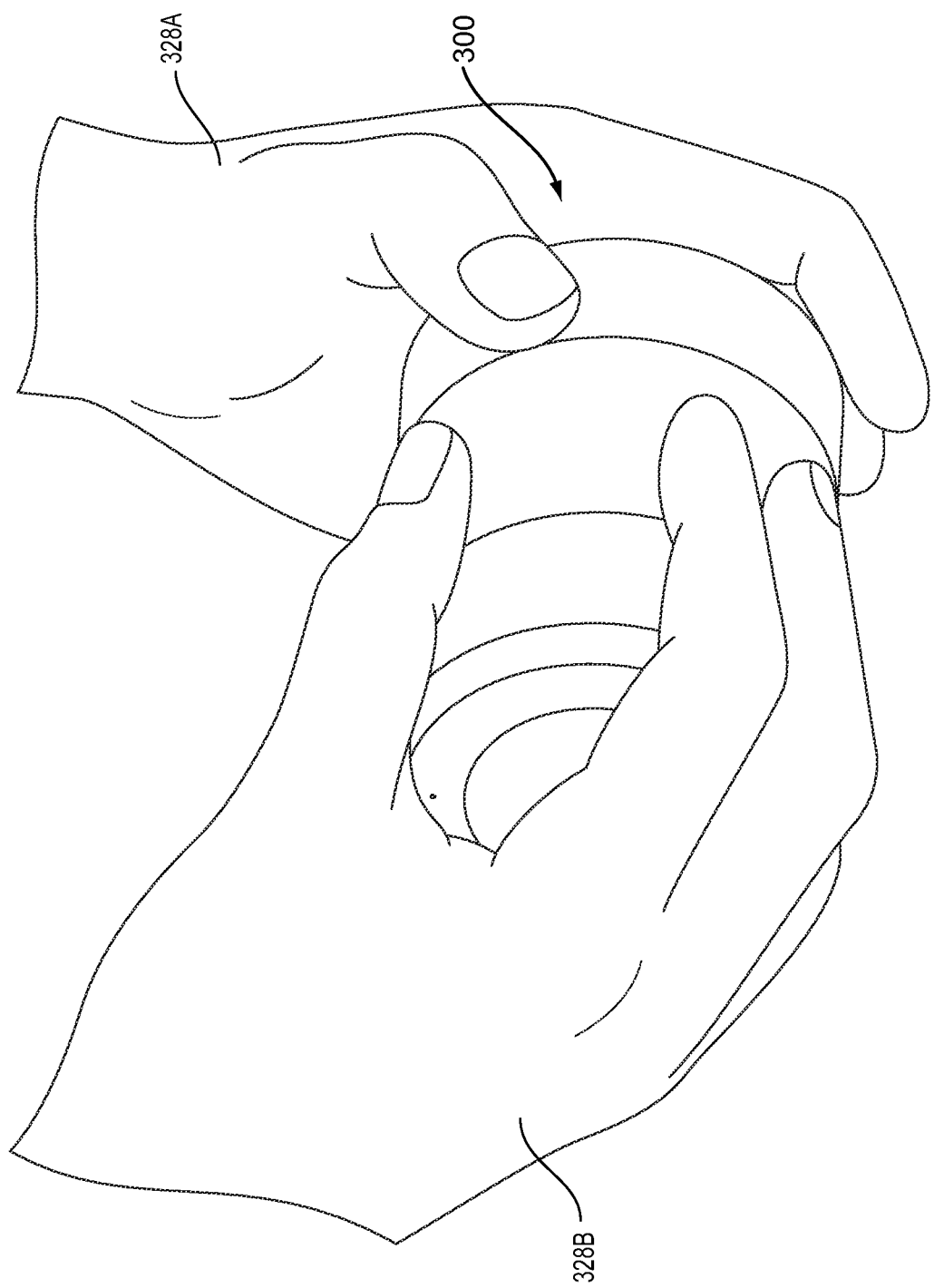

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
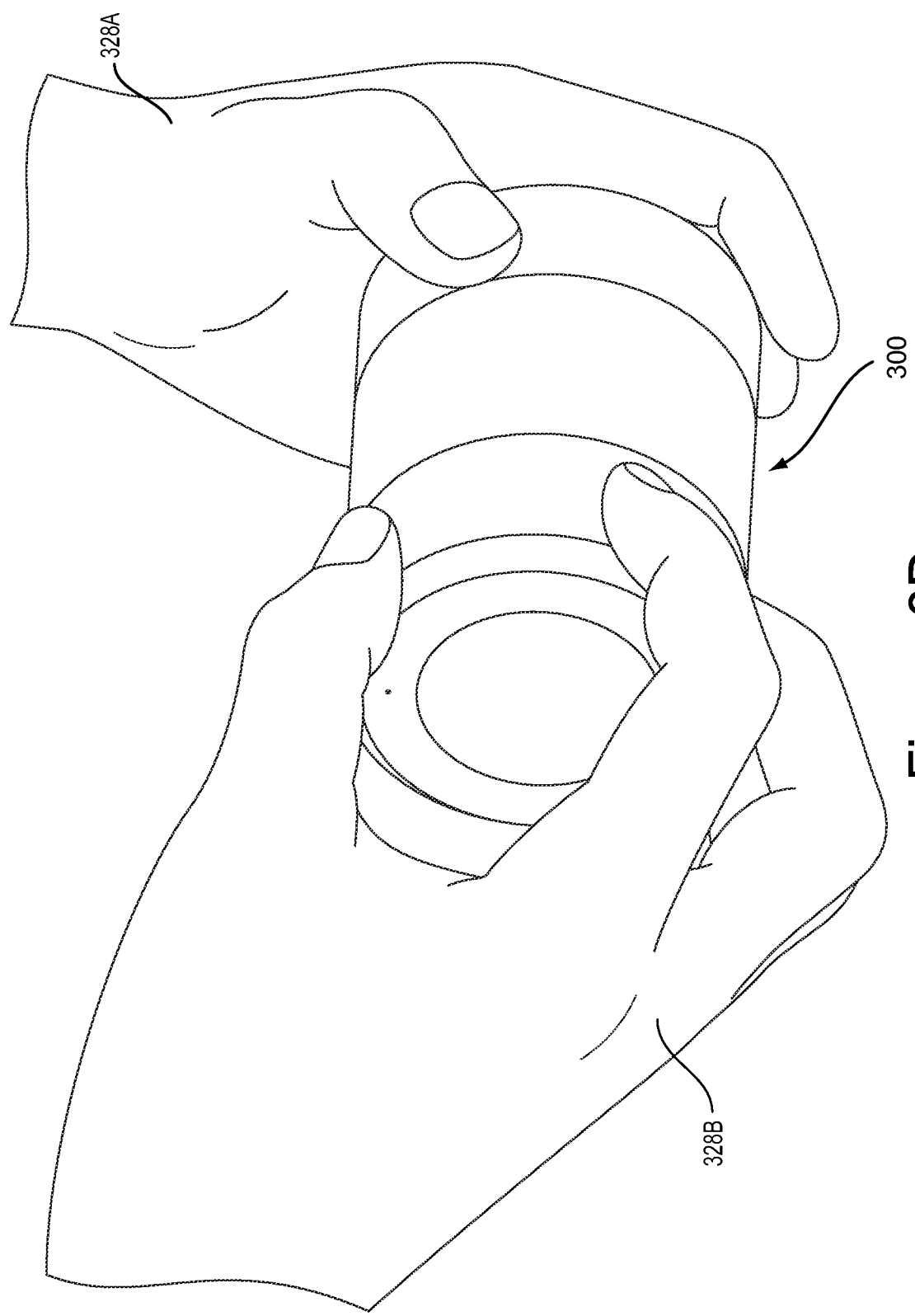

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger refraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
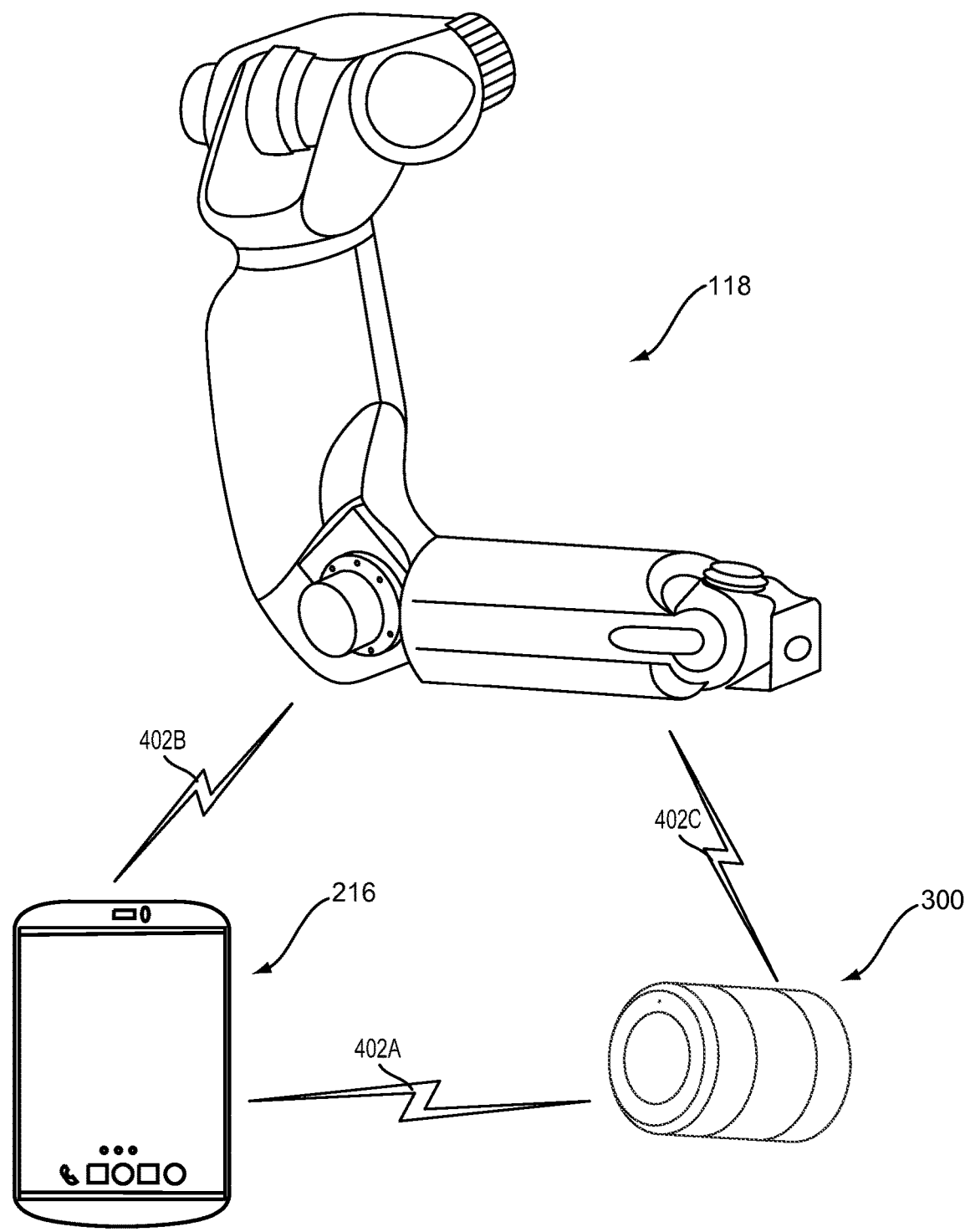
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some embodiments, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementation s, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

III. ILLUSTRATIVE METHODS

Figure 5:
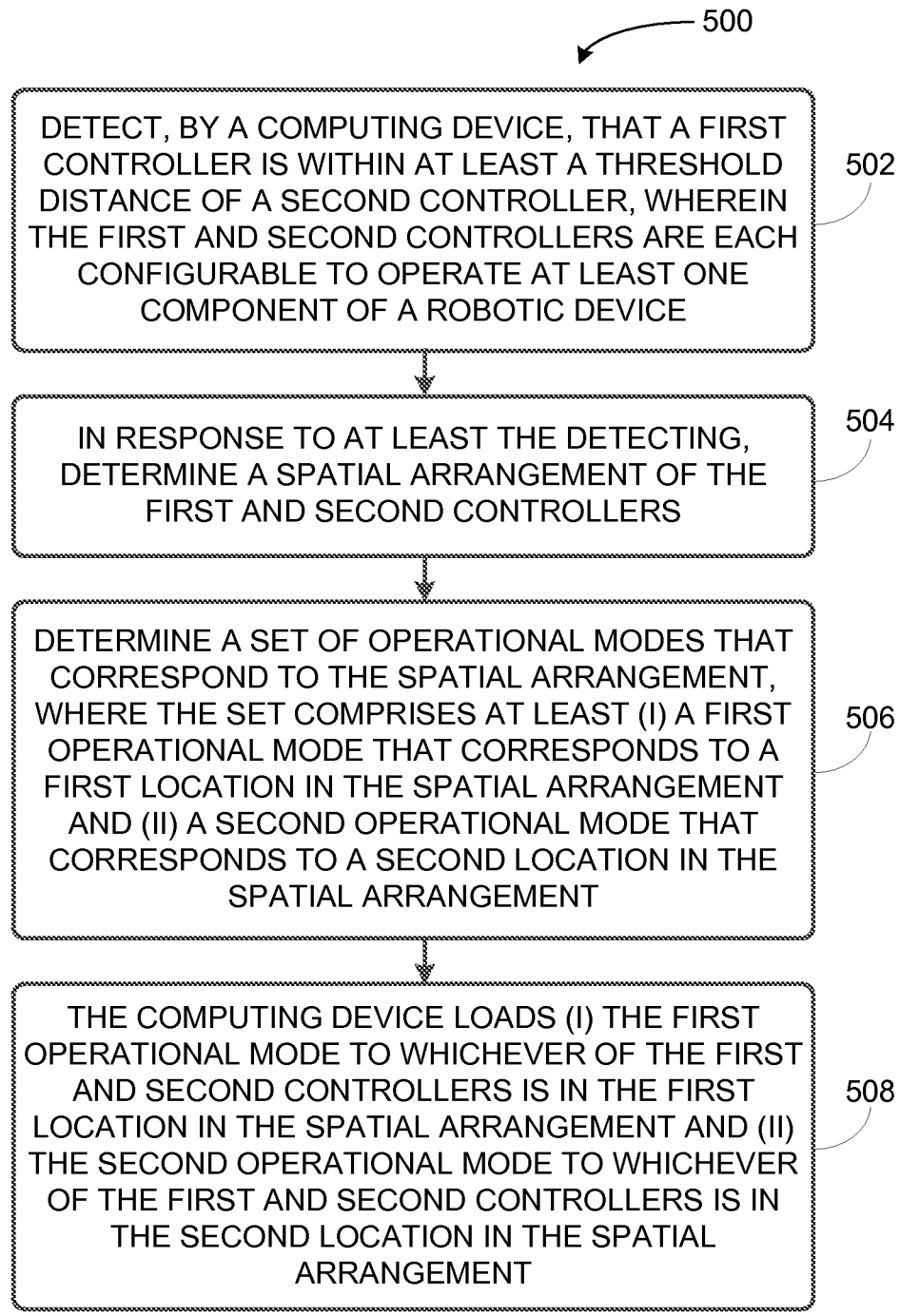
FIG. 5 is an example flowchart for determining a set of operational modes, according to an example implementation.

FIG. 5 is a flowchart illustrating a method 500, according to an example implementation. In particular, method 500 may be implemented to determine a set of operational modes that corresponds to a spatial arrangement of two or more controllers.

Method 500 shown in FIG. 5 (and other processes and methods disclosed herein) presents a method that can be implemented within an arrangement involving, for example, the robotic system 100, the robotic arm 118, the computing device 200, tablet 216, controller 300, and/or within the arrangement 400 shown in FIG. 4 (or more particularly by one or more components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include one or more operations, functions, or actions as illustrated by one or more of blocks 502 to 506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, method 500 involves detecting, by a computing device, that a first controller is within at least a threshold distance of a second controller, where the first and second controllers are each configurable to operate at least one component of a robotic device. In an example implementation, the computing device 200 may detect in one of various ways that a first controller (e.g., taking the form of controller 300) is within a threshold distance away from (e.g., threshold proximate to) a second controller (e.g., also taking the form of controller 300).

In one example, at least one wireless signal emitter may be positioned on the second controller (and/or the first controller). In this example, the wireless signal emitter may transmit signals continuously or from time-to-time. These signals may have emitter identification (ID) embedded thereon to represent the particular emitter that emits the corresponding signal. Additionally, in this example, the first controller (and/or the second controller) may have a wireless signal receiver configured to receive signals such as those emitted by the wireless signal emitter. Upon receiving a signal via the wireless signal receiver (e.g., over a wireless communication link), the first controller may send to the computing device 200 (e.g., via link 402A) a message noting that the signal has been received from the second controller. The computing device 200 may use this message as an indication that the second controller is within a threshold distance of the first controller.

In another example, the message sent from the first controller to the computing device 200 may include information such as the emitter ID and/or strength of the received signal, among others. The computing device 200 could use the emitter ID to determine the particular emitter that emitted the signal, thereby determining that the second controller emitted the signal. Also, the computing device 200 may determine a distance between the wireless signal receiver and the particular wireless signal emitter. In particular, this distance may be determined, among other ways, by determining a distance corresponding to the strength of the signal received by the first controller. Alternatively, the first controller may determine the emitter ID and/or the distance and may then send this information to the computing device 200.

After determining the distance, the computing device 200 may determine that the distance is less than a threshold distance or may determine that the distance is more than the threshold distance. Alternatively, if the first controller is the entity that determines the distance, the first controller may determine that the distance is less than a threshold distance or may determine that the distance is more than the threshold distance. Upon this determination, the first controller may send data to the computing device 200, where the data indicates whether or not the distance is less than the threshold distance, among other indications (e.g., value of the determined distance).

Other examples for determining proximity may also be possible. For instance, any one of the systems (e.g., first controller, second controller, or the computing device 200) may be configured to determine coordinates in physical space (e.g., GPS coordinates) of any one of the other systems. Using such coordinates, the corresponding systems can determine distances between the various physical entities and thus determine that the distance is less than a threshold distance as discussed above. Moreover, the example implementations discussed herein are not limited to a situation involving only two controllers because proximity of additional controllers could also be determined. For instance, one of the entities could determine that a third controller is within some threshold distance of the second controller and/or within some threshold distance of the first controller. In this manner, the system could determine that two or more controllers are within some threshold distances of one another. In yet another example, NFC (or other proximity detection technology) and RFID could be used in combination to determine that two particular controllers are threshold proximate. For instance, the computing device 200 may receive an indication of proximity for the particular controller from the NFC technology.

In some cases, the computing device 200 (or perhaps another entity) could also determine that the first and second controllers are each within a threshold distance of the robotic system 100 (or of a robotic system component), such as by using any of the proximity detection techniques discussed above (or other techniques). As noted above, the first and second controllers (e.g., both taking the form of controller 300) are each configurable to operate the robotic system 100 or at least one component of the robotic system 100. As such, in these cases the computing device 200 could take actions as discussed below in response to (i) determining that the first controller is within a threshold distance of the second controller and perhaps also in response to (ii) determining that the first and second controller are each within a threshold distance of the robotic system 100 (or of a robotic system component). Other cases are also possible.

Figure 6:
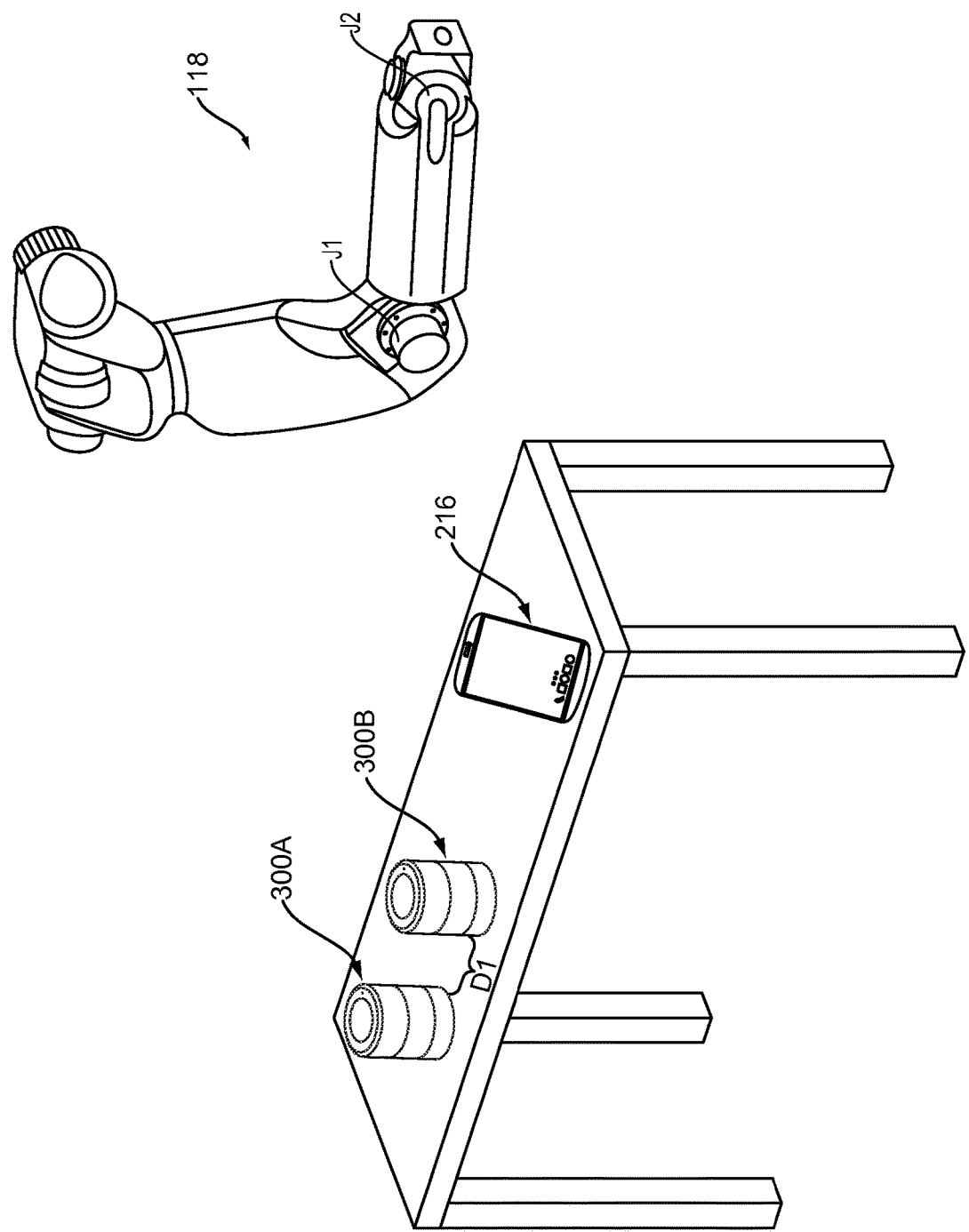
FIG. 6 illustrates proximity between two controllers, according to an example implementation.

To illustrate detection of proximity and subsequent operation, consider FIG. 6, which shows an arrangement where example controller 300A is positioned at a distance D1 (e.g., two feet) away from example controller 300B. The tablet 216 can receive information about the distance D1 (e.g., via a communication link 402A) and can determine that the distance D1 is within a threshold distance (e.g., four feet). With this arrangement, controllers 300A to 300B are then each configurable to control a component of robotic arm 118, such as control of joint J2 for instance. Other arrangements are also possible.

At block 504, method 500 involves in response to at least the detecting, determining a spatial arrangement of the first and second controllers. Once the computing system 200 detects that two or more controllers are substantially threshold proximate to one another, the computing system 200 may determine a spatial arrangement of the controllers. The computing system 200 may do so in one of various ways.

In one example, at least one wireless signal emitter may be positioned on each controller. The wireless signal emitter may emit signals continuously or from time-to-time. These signals may have emitter identification (ID) embedded thereon to represent the particular emitter that emits the corresponding signal. Additionally, in this example, the computing device 200 may have a directional wireless signal receiver configured to (i) receive signals such as those emitted by the wireless signal emitter, as well as to (ii) determine a direction of an incoming signal. When the computing device 200 receives a signal via the wireless signal receiver, the computing device can determine strength of the received signal in order to determine a distance of the emitter relative to the receiver. The computing device 200 may then use the determined distance, the direction of the incoming signal, and the emitter ID to determine a relative spatial location in physical space of a particular controller. In this manner, the computing device 200 can determine the spatial arrangement by determining the relative spatial location of each controller.

In another example, a camera could obtain at least one image including the controllers. The camera could be part of the computing device 200 or could be separate from the computing device 200. In either case, the computing device 200 may obtain the image and use one of various image processing techniques to determine the spatial arrangement of the controllers. For instance, the image processing may recognize an outline of each controller so as to distinguish between the controllers and may then determine a spatial location of each controller relative to spatial locations of the other controllers within the image. These relative spatial locations within the image may thus define the spatial arrangement.

In yet another example, each controller may include at least one motion sensor. In this example, the computing device 200 may direct a user to position the controller in a predetermined spatial arrangement (e.g., stack the controller on top of each other). Once the controllers are in the predetermined spatial arrangement, the controllers could be repositioned to any other spatial arrangement. During this repositioning, the computing device 200 may receive information from the motion sensor of each controller. Such information may include direction of movement of a respective controller and speed of movement of the respective controller, among other possibilities. The computing device 200 may then use this information to determine a new spatial location of each controller. In this manner, the computing device 200 can determine the new spatial arrangement based on determination of a new spatial location for each controller.

In yet another example, each controller may include an accelerometer so that a user can provide a gesture indicating direction (e.g., tilt the controller in the appropriate direction). Based on the direction, the computing device 200 may determine a respective location of a nearby controller. The user may thus do so for each controller so as to help the computing device 200 determine the spatial arrangement. In yet another example, each controller may include a magnetometer/magnetic compass configured to generate heading data. In this example, the computing device 200 may receive data from each magnetometer to determine each respective heading. Based on each respective heading, the computing device 200 may then determine the respective spatial arrangement. In yet another example, the computing device 200 may determine GPS coordinates for each controller and may then use these coordinates to determine the spatial arrangement. In yet another example, each controller may include a barometer that provides altitude data. In this example, the computing device 200 may receive from each controller the respective altitude data and may then determine relative altitudes of the controllers so as to help determine the spatial arrangement. Other examples and combinations of the above examples are also possible.

In a further aspect, responsive to detecting threshold proximity of the controllers, the computing device 200 may determine the respective spatial orientations of the controllers in the spatial arrangement. By way of example, each controller may include an inertial measurement unit (IMU) and/or a gyroscope that can measure and report orientation of the respective controller. The computing device 200 may thus obtain information regarding orientation of each controller from each IMU. Accordingly, the computing device can determine orientations of the controllers in the spatial arrangement relative to one another.

In some implementations, responsive to detecting threshold proximity of the controllers, the computing device 200 may also determine a spatial location of the robotic system 100 (or of a component of the robotic system 100) relative to the spatial arrangement of the controller. The computing system 200 may do so using any of the techniques discussed above for determining relative spatial locations of entities, among other techniques. Similarly, responsive to detecting threshold proximity of the controllers, the computing device 200 may also determine an orientation of the robotic system 100 (or of a component of the robotic system 100) relative to respective orientations of the controllers in the spatial arrangement. The computing system 200 may do so using any of the techniques discussed above for determining relative orientations of entities, among other techniques. Other aspects and implementations are also possible.

As further discussed below, any of the following may become factors in determination of operational modes for the controllers: the spatial arrangement of the controllers, the spatial location of the robotic system 100 (or of a robotic system component), respective orientations of the controllers in the spatial arrangement, and orientation of the robotic system 100 (or of a robotic system component). Additional factors will be introduced as part of the discussion of FIGS. 6 and 7A to 7D while other possible factors will become apparent to those skilled in the art.

FIGS. 6 and 7A to 7D next illustrate various example spatial arrangements for the controllers. These spatial arrangements are shown by way of example and are not meant to be limiting. Further, FIGS. 6 and 7A to 7D show controllers placed on a table. Hence, the controller could be designed such that, while the controller is positioned on the table, the knob of a controller could be turned relative to the base without the whole controller spinning relative to the table. This could be implemented in one of several ways. In one example, the controller may include a weighted lower half (e.g., a weighted base), that helps to hold the lower half in place while the knob is rotated. In another example, the controller may include a high friction surface (e.g., made of rubber) on a lower half of the controller (e.g., on the base). In yet another, example, a control surface (e.g., a dock) could be designed to hold the controller. For instance, the controller surface may include a notch that complement a groove on the controller (or vice versa) so as to allow for rotation of the knob relative to the base without the whole controller spinning relative to the table. Other examples are also possible.

FIG. 6 shows a linear spatial arrangement where example controller 300A is positioned at a distance D1 away from example controller 300B. As shown, this spatial arrangement includes two controllers. However, other spatial arrangement could include three or more controller as illustrated in FIGS. 7A to 7D. As further discussed below, the number of controllers in the spatial arrangement may also become a factor in determination of operational modes for the controllers.

Figure 7A:
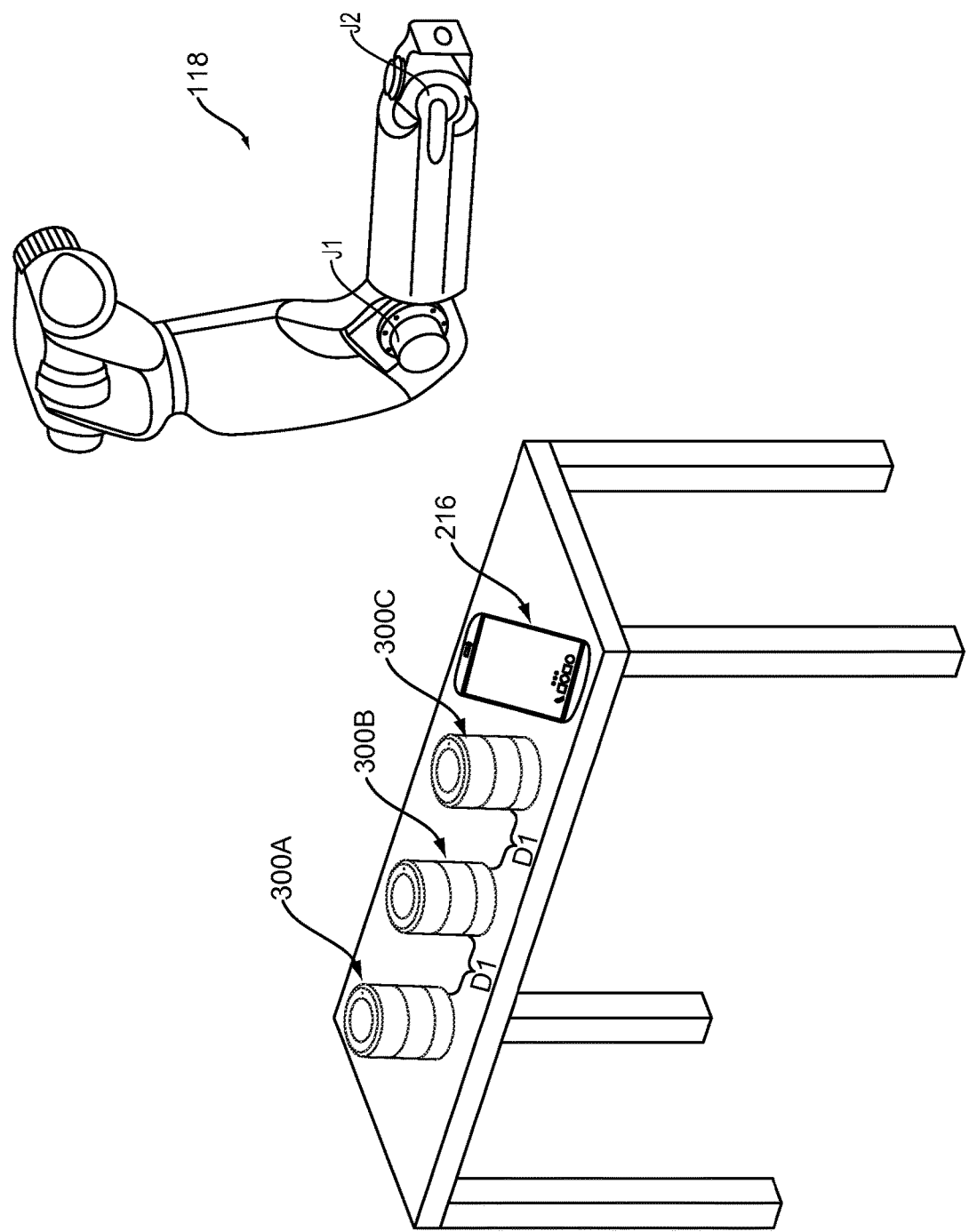
FIGS. 7A to 7D illustrate various example spatial arrangements for two or more controllers, according to an example implementation.
Figure 7B:
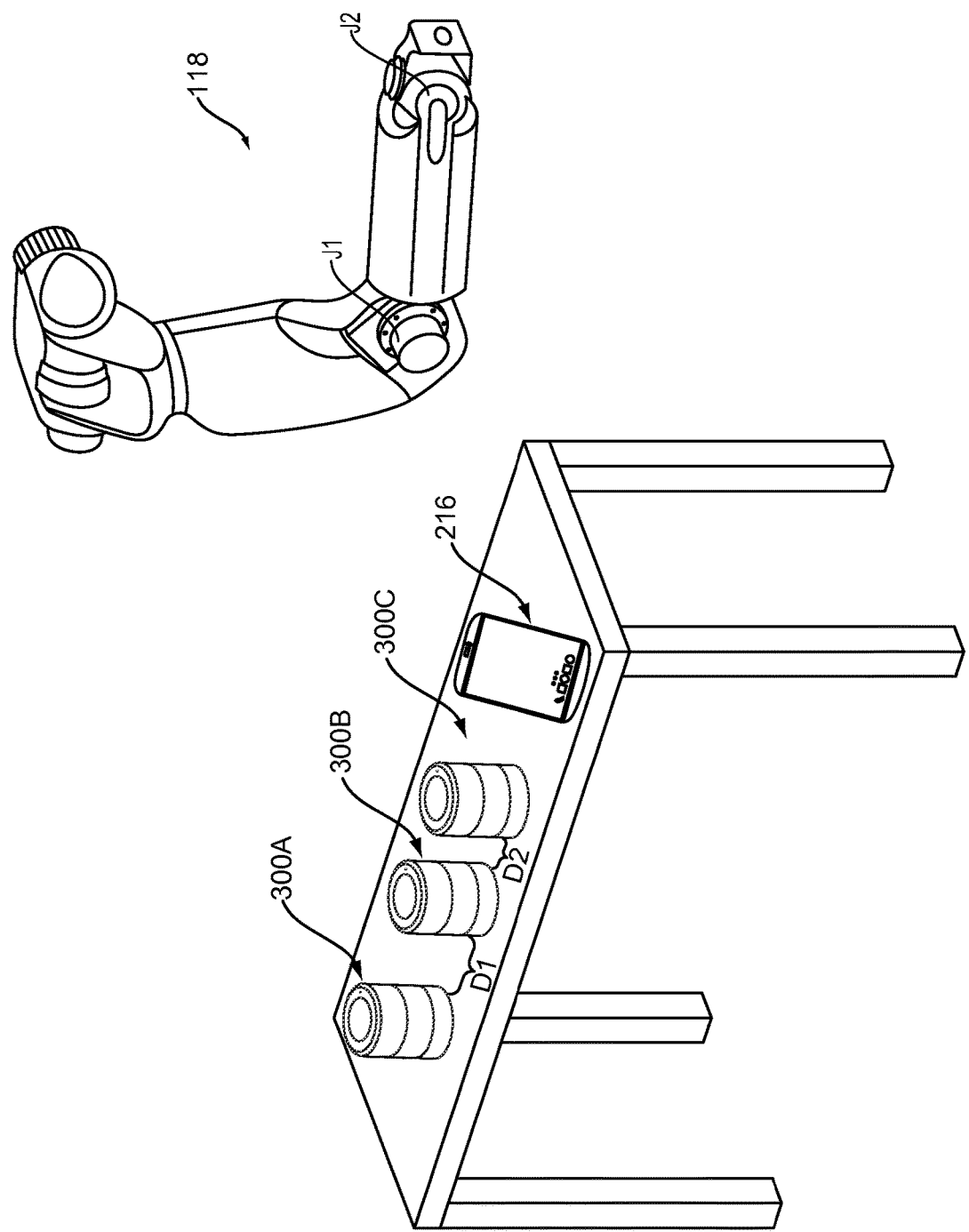

FIG. 7A next shows a linear spatial arrangement of example controllers 300A to 300C where controller 300A is positioned at a distance D1 away from controller 300B and then controller 300B is positioned at a distance D1 (i.e., the same distance) away from controller 300C. FIG. 7B then also shows a linear spatial arrangement of example controllers 300A to 300C. However, FIG. 7B the distances between the controllers are different from those shown in FIG. 7A. In particular, controller 300A is positioned at a distance D1 away from controller 300B and then controller 300B is positioned at a distance D2 away from controller 300C. Accordingly, determining the spatial arrangement of the controllers may also involve determining distances between the various controllers in the arrangement. As further discussed below, such variations in distances between the controllers may also become a factor in determination of operational modes for the controllers.

Figure 7C:
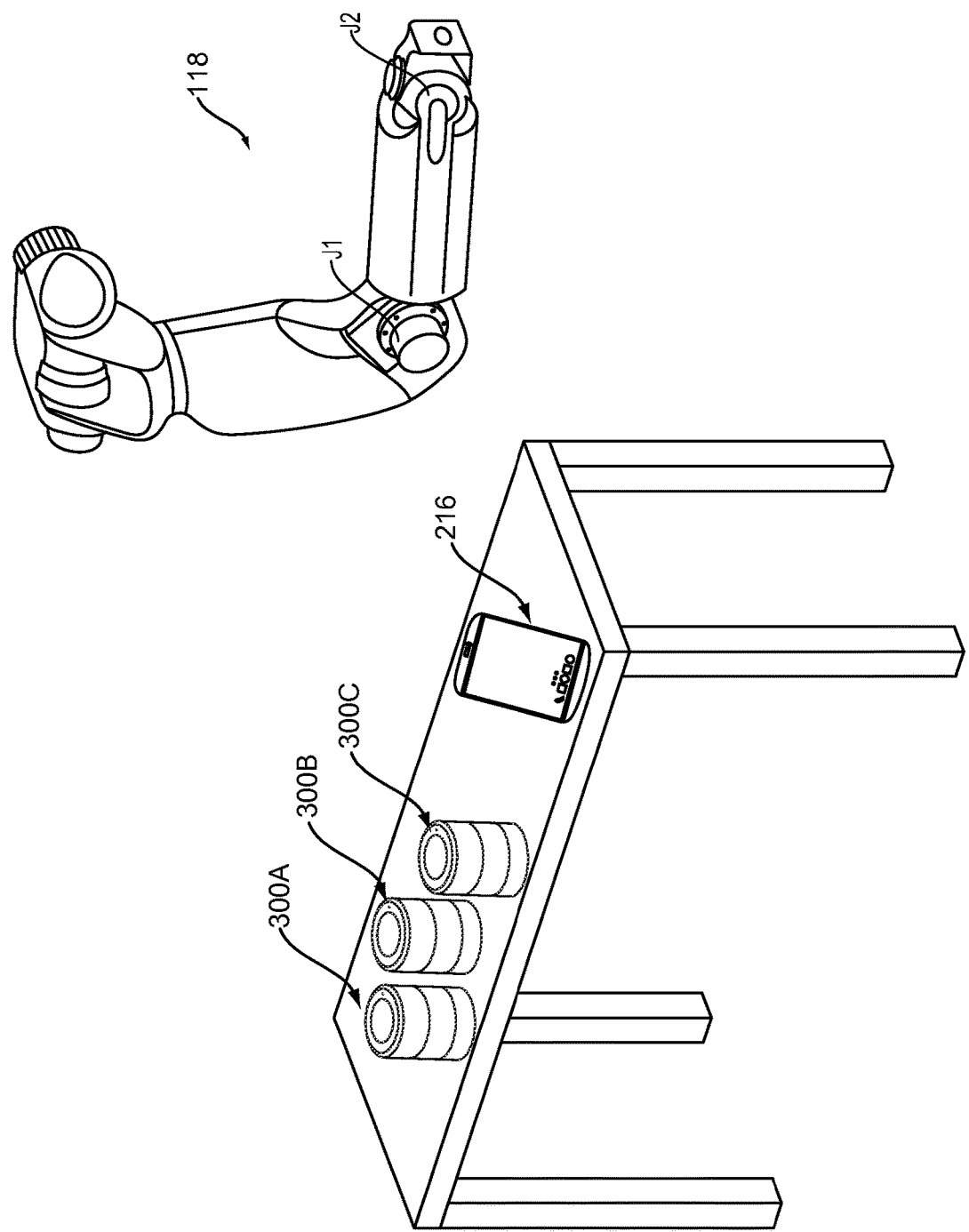

FIG. 7C next shows a substantially triangular spatial arrangement of example controllers 300A to 300C. Such a triangular arrangement could take on any triangular form so long as distance between the two controllers that are furthest from one another is less than a threshold distance (e.g., so long as the longest side of the triangle is less than some predetermined length). For instance, such a triangular arrangement could take the form of an equilateral triangle, an isosceles triangle, or a scalene triangle, among other possibilities. In this manner, the spatial arrangement could take on one of various shapes (e.g., triangle, rectangle, circle etc.) and each such shape could take on one of various forms. Accordingly, determining the spatial arrangement of the controllers may also involve determining the shape and/or form of the spatial arrangement. As further discussed below, such variations in shape and/or form may also become a factor in determination of operational modes for the controllers.

Figure 7D:
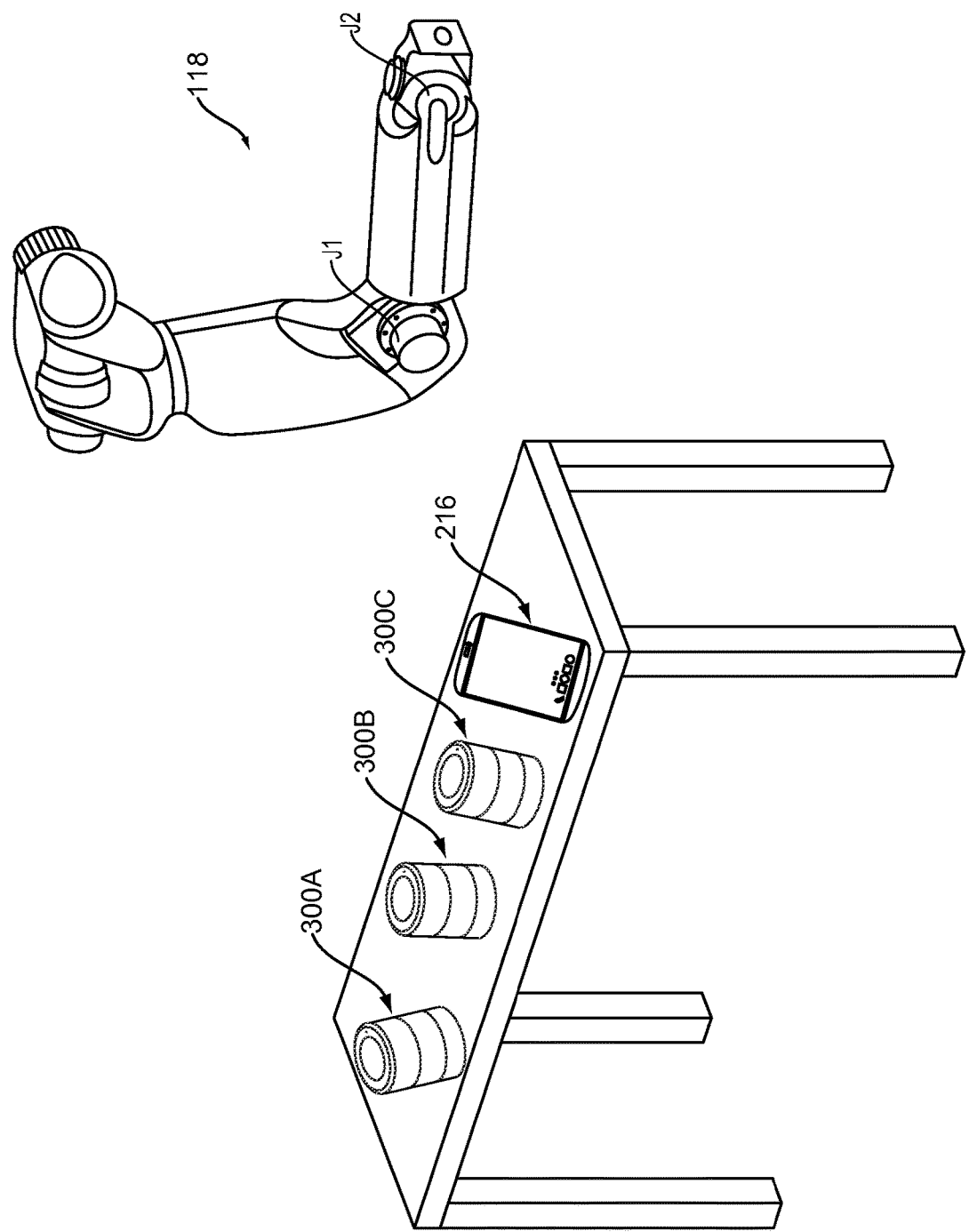

FIG. 7D next shows a substantially linear spatial arrangement where the various controllers in the arrangement each have different respective spatial orientations relative to one another. As noted, responsive to detecting threshold proximity of the controllers, the computing device 200 could determine the respective spatial orientations of the controllers in the spatial arrangement. Also, as noted, the respective orientations of the controllers in the spatial arrangement may also become a factor in determination of operational modes for the controllers. Further, note that the controllers could be positioned on the table in these orientations in one of various ways, such as by being positioned on an angled controller holding apparatus for instance.

In a further aspect, determining the respective spatial orientations of the controllers in the spatial arrangement could involve determining respective spatial orientation of the knobs of the controllers in the spatial arrangement. In particular, each knob may include a zero point (also referred to as a center point) that could be used to define a zero angle for rotation of the knob relative to the base. When no rotational force is applied to the knob, a mark at the top of the knob (as shown in FIGS. 7A-7D) may be at this zero point. Accordingly, the controllers may be positioned on the table with each controller having a knob at the zero point. However, some controllers could be positioned such that a mark on one controller is angled different with respect to a mark on another controller. This could happen if an entire controller (e.g., including the base) is rotated about its center axis relative to the table (e.g., despite the knob being at the zero point). In this manner, the knob of the controllers in the arrangement could have different respective spatial orientations relative to on another. Other example spatial arrangements and factors are also possible.

At block 506, method 500 involves determining a set of operational modes that corresponds to the spatial arrangement, where the set comprises at least (i) a first operational mode that corresponds to a first location in the spatial arrangement and (ii) a second operational mode that corresponds to a second location in the spatial arrangement. Once the computing device 200 determines the spatial arrangement of the controllers and perhaps also determines one or more of the other factors noted above in relation to determining the spatial arrangement, the computing device 200 may determine a set of operational modes the corresponds to the spatial arrangement and perhaps to these factors as well. As further discussed below, each operational mode in the set could then be used to control a different aspect of the robotic system 100 (or of at least one robotic system component).

In one case, the computing device 200 may determine the set strictly based on the determined spatial arrangement such as without consideration of the other factors. In another case, the computing device 200 may determine the set based on the spatial arrangement as well as based on the respective spatial orientations of the controllers. In yet another case, determining the set may also be based on the spatial location of the robotic system 100 (or of at least one robotic system component) relative to the spatial arrangement. In yet another case, determining the set may also be based on the orientation of the robotic system 100 (or of at least one robotic system component) relative to respective orientations of the controllers in the set. In yet another case, determining the set could also be based on one or more of the following factors: distances between the various controllers in the arrangement, the number of controllers in the arrangement, and the shape and/or form of the spatial arrangement. Other cases are also possible.

In either case, the computing device 200 could determine the set in one of various ways. By way of example, the computing device 200 may include (e.g., have stored thereon in data storage 204) or have access (e.g., via a cloud-based service) to a table that maps various sets of operational modes to corresponding spatial arrangements and/or other factors. With this implementation, the computing device 200 may thus be programmed to refer to that table to determine the set of operational modes. In a further aspect, the table may also include data that associated each operational mode within a determined set with a location (e.g., location of a controller) in the spatial arrangement. Other examples and aspects are also possible.

As noted, each operational mode in the determined set could be used for control of a different aspect of the robotic system 100 (or of at least one robotic system component). Some of the following examples are discussed in the context of a spatial arrangement including a first and second controller as well as in the context of a determined set (i.e., for this spatial arrangement) including first and second operational modes. However, the following examples are not limited to an arrangement including two controllers and could extend to arrangements including two or more controllers and thus to determined sets including two or more operational modes.

In one example, the first and second operational modes may be used for control of different aspects of rotation of a particular joint of the robotic system 100. For instance, the first operational mode may correspond to generation of output data, by the first controller, that is used to determine commands (e.g., by computing device 200) for controlling rotation of the joint about a particular axis. Such axis could correspond to cartesian space or euler space, among others. Moreover, the spatial positioning in cartesian coordinates could be translated to a different corresponding set of values (e.g., different coordinate system) for some or all of the controllers. More specifically, this may involve the first operational mode corresponding to generation of output data for control of a particular actuator that is coupled to this joint and is thus responsible for causing rotation of the joint about the particular axis. Whereas, the second operational mode may correspond to generation of output data, by the second controller, that is used to determine commands (e.g., by computing device 200) for controlling rotation of the joint about another axis that is different from the particular axis. More specifically, this may involve the second operational mode corresponding to generation of output data for control of a different actuator that is coupled to this same joint and is thus responsible for causing rotation of the joint about the other axis.

In another example, the first operational mode may correspond to generation of output data, by the first controller, that is used to determine commands (e.g., by computing device 200) for controlling translation of the joint along a particular axis. More specifically, this may involve the first operational mode corresponding to generation of output data for control of a particular actuator that is coupled to this joint and is thus responsible for causing translation of the joint along the particular axis. Whereas, the second operational mode may correspond to generation of output data, by the second controller, that is used to determine commands (e.g., by computing device 200) for controlling translation of the joint along another axis that is different from the particular axis. More specifically, this may involve the second operational mode corresponding to generation of output data for control of a different actuator that is coupled to this same joint and is thus responsible for causing translation of the joint along the other axis.

In yet another example, the first operational mode may correspond to generation of output data, by the first controller, that is used to determine commands (e.g., by computing device 200) for controlling direction of movement of a particular movable component 116. Whereas, the second operational mode may correspond to generation of output data, by the second controller, that is used to determine commands (e.g., by computing device 200) for controlling speed of movement of the particular movable component 116.

In yet another example, the first operational mode may correspond to generation of output data, by the first controller, that is used to determine commands (e.g., by computing device 200) for controlling a first component of the robotic system 100. Whereas, the second operational mode may correspond to generation of output data, by the second controller, that is used to determine commands (e.g., by computing device 200) for controlling a second component of the robotic system 100. In this manner, the computing system 200 may use the spatial arrangement to essentially select a different operational mode for each controller such that each controller then controls a different component of the robotic system 100.

Various other parameters could be assigned to the controllers. For example, an operational mode may correspond to generation of output data, by a controller, that is used to determine commands (e.g., by computing device 200) for controlling torque applied about an axis of the robotic system 100. In another example, an operational mode may correspond to generation of output data, by a controller, that is used to determine commands (e.g., by computing device 200) for controlling torque to provide gravity compensation of a component of the robotic system 100. In yet another example, an operational mode may correspond to generation of output data, by a controller, that is used to determine commands (e.g., by computing device 200) for controlling acceleration of a component of the robotic system 100. Various other examples are also possible.

At block 508, method 500 involves the computing device loading (i) the first operational mode to whichever of the first and second controllers is in the first location in the spatial arrangement and (ii) the second operational mode to whichever of the first and second controllers is in the second location in the spatial arrangement.

Once the computing device 200 determines the set of operational modes, the computing device 200 may load the each respective operational mode of the set onto a respective controller within the arrangement so as to cause the respective controller to operate in accordance with the respective operational mode. As noted above, each operational mode in the set may correspond to a particular location within the spatial arrangement. As such, the computing device 200 may load each respective operational mode of the set to the respective controller in the spatial arrangement that is located at the location corresponding the respective operational mode.

By way of example, this may involve the computing device 200 determining the particular location corresponding to a respective operational mode of the set (e.g., by referring to the above-mentioned table). In response to the computing device 200 determining this particular location, the computing device 200 may determine which of the controllers in the spatial arrangement is located in this particular location. Then, in response to the computing device 200 determining which of the controllers in the spatial arrangement is located in this particular location, the computing device 200 may load this respective operational mode onto the controller that is located at this particular location.

Once the respective operational mode has been loaded onto the appropriate controller, this controller may be set to operate a particular aspect of the robotic system 100 (or a particular aspect of a robotic system component). As discussed above, operating this particular aspect may involve the controller generating output data that is indicative of: touch data at the respective touch pad of the controller and/or of rotation of the rotatable knob of this controller, among other. When the computing device 200 receives this output data from the controller, the computing device 200 may generate commands for control of the particular aspect of the robotic system 100 (or the particular aspect of the robotic system component) in accordance with this output data. In this manner, the computing device 200 can update the operational mode of one or more of the controllers within the spatial arrangement.

Figure 8A:
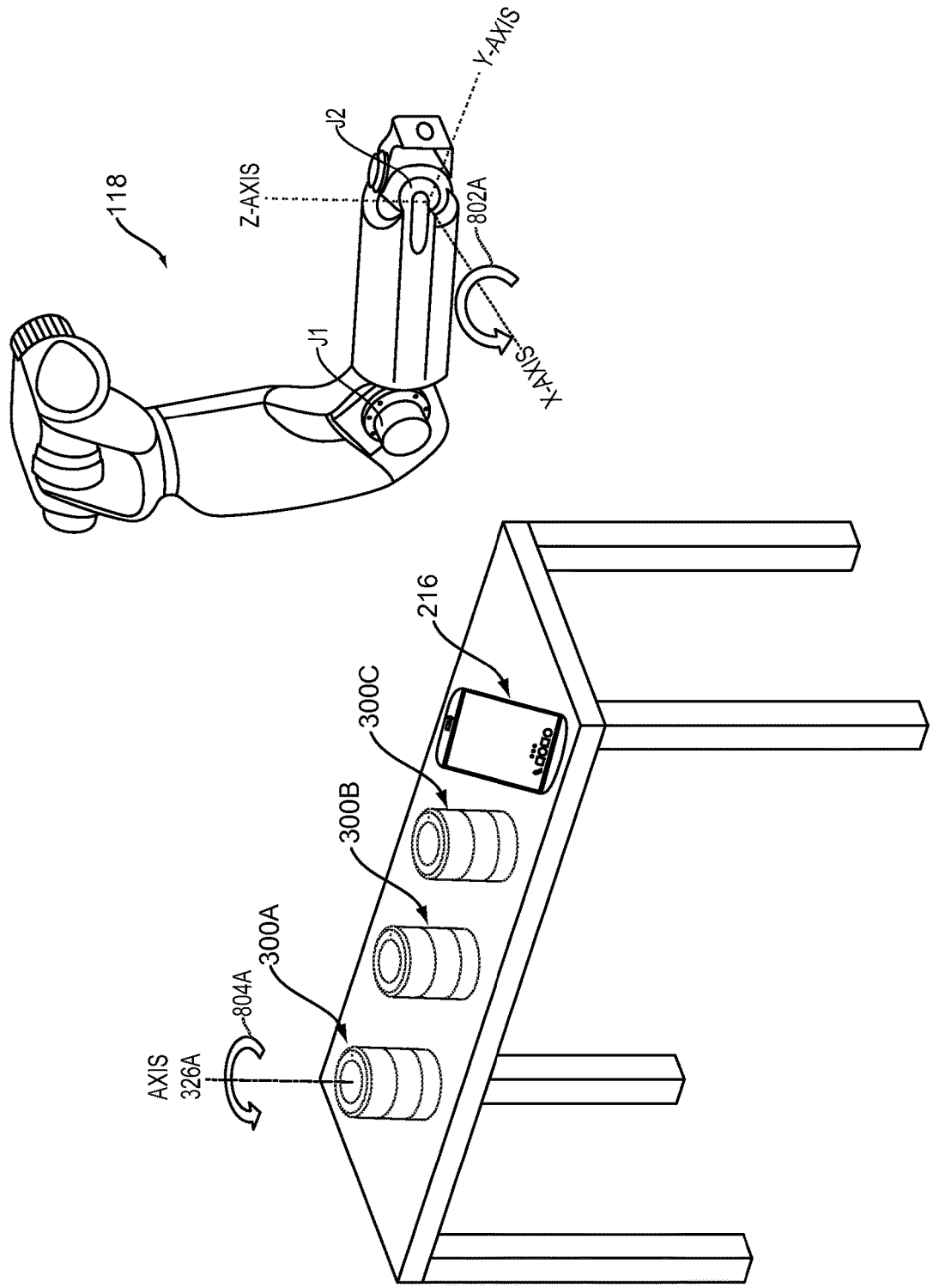
FIGS. 8A to 8C illustrate example control of a robotic arm after a set of operational modes has been loaded onto controllers that are arranged in a particular spatial arrangement, according to an example implementation.
Figure 8B:
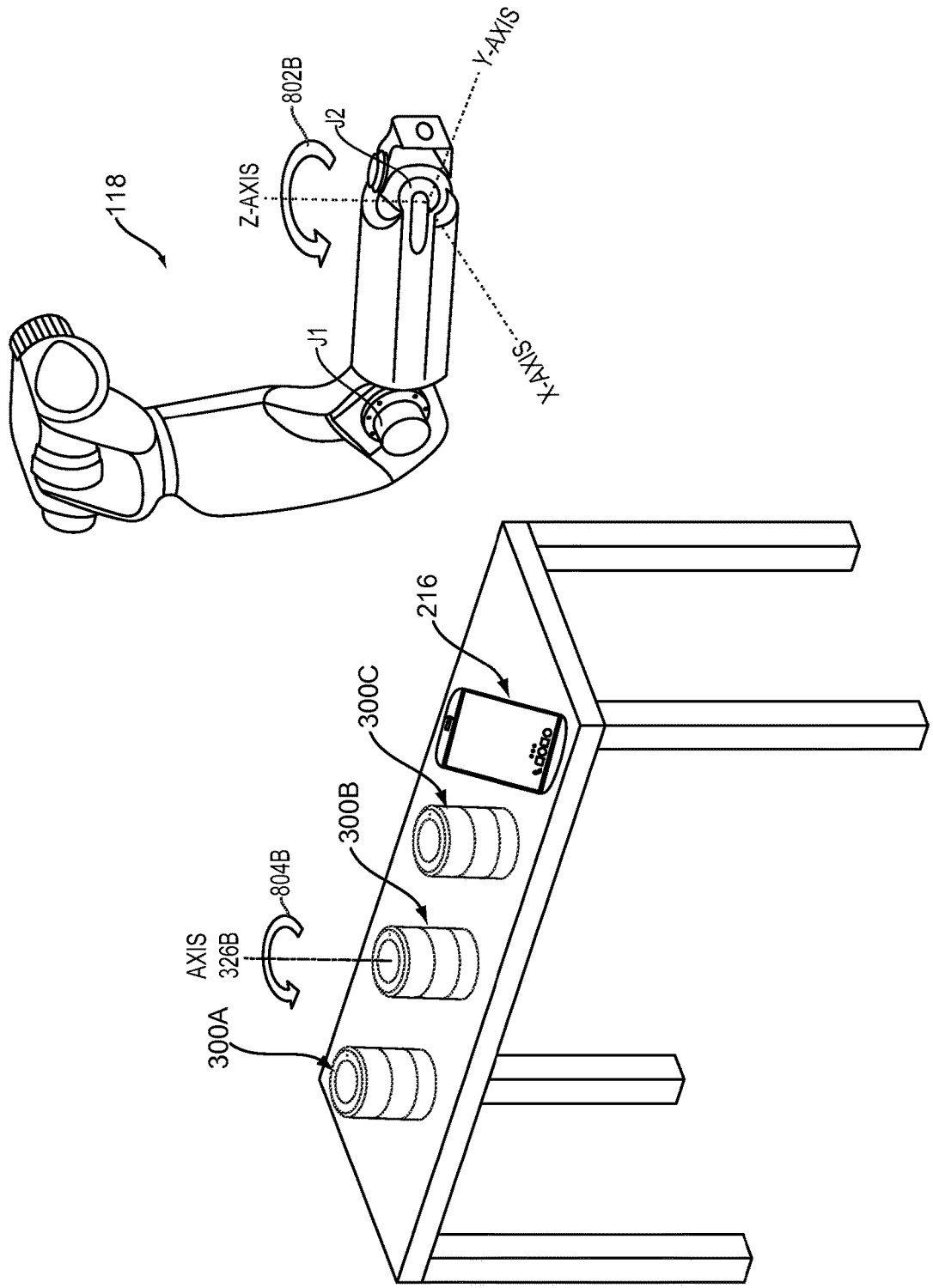
Figure 8C:
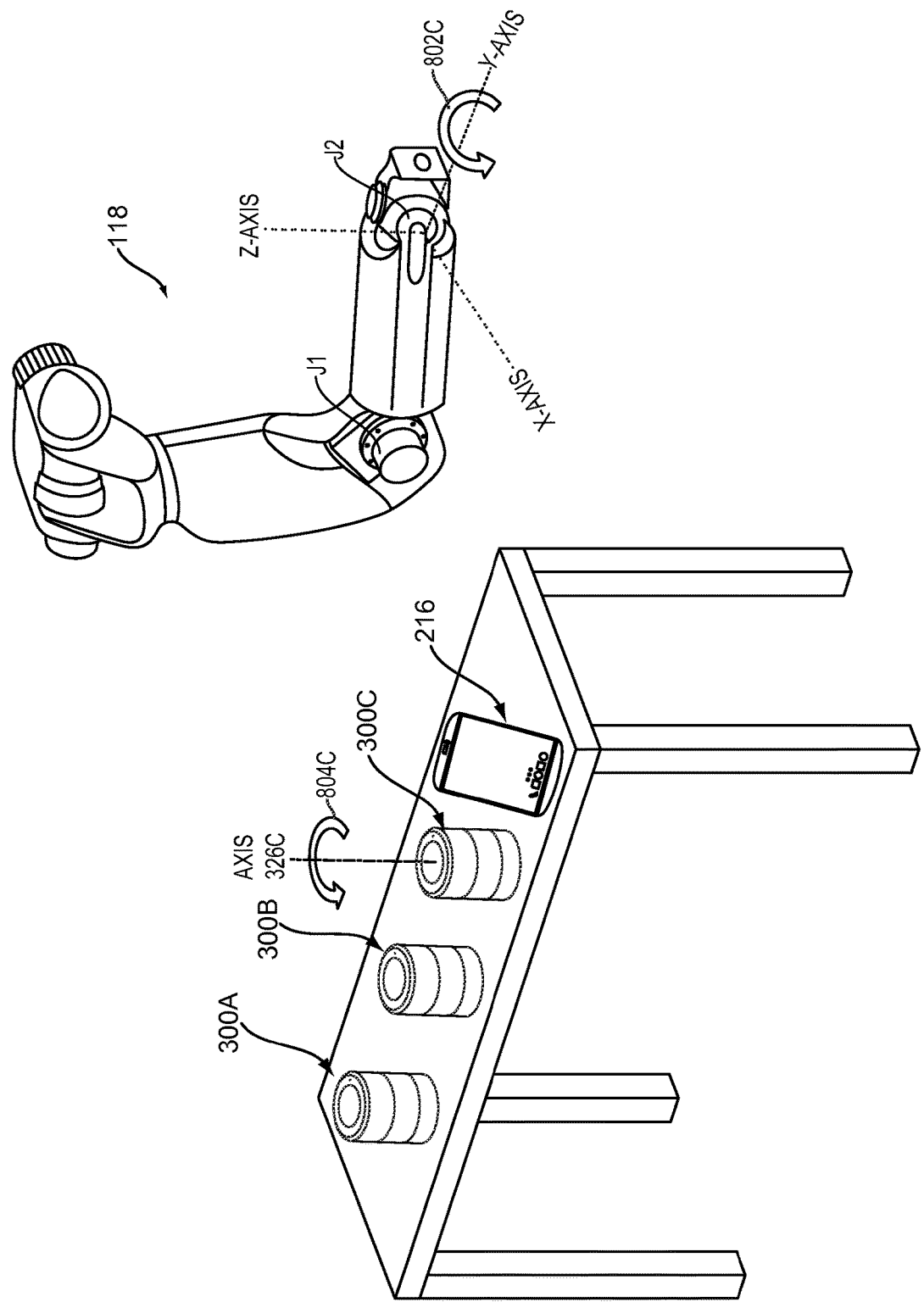

FIGS. 8A to 8C illustrate the example linear spatial arrangement first introduced in FIG. 7A. In this example illustration, a different operational mode has been loaded onto each controller from among controllers 300A to 300C. As shown at FIG. 8A, a first operational mode has been loaded onto controller 300A such that controller 300A generates output data that is used to determine commands (e.g., by tablet 216) for controlling rotation 802A of the joint J2 about an x-axis. By way of example, this rotation 802A could be based on rotation 804A of the respective knob of controller 300A. As shown at FIG. 8B, a second operational mode has been loaded onto controller 300B such that controller 300B generates output data that is used to determine commands (e.g., by tablet 216) for controlling rotation 802B of the joint J2 about a z-axis. By way of example, this rotation 802B could be based on rotation 804B of the respective knob of controller 300B. As shown at FIG. 8C, a third operational mode has been loaded onto controller 300C such that controller 300C generates output data that is used to determine commands (e.g., by tablet 216) for controlling rotation 802C of the joint J2 about a y-axis. By way of example, this rotation 802C could be based on rotation 804C of the respective knob of controller 300C. Note that the above example implementations relate to control of individual robotic system joints (e.g., forward kinematics (FK)). However, the above implementation may also extend to control of end effector motion (e.g., inverse kinematics (IK)), among other possibilities. Other examples are also possible.

VI. ADDITIONAL FEATURES

In another aspect, the computing device 200 could detect a change in the spatial arrangement and/or to other factors, such as at a point in time after a set of operational modes has already been loaded onto the controllers in the spatial arrangement. In response to detecting this change, the computing device 200 may determine if a different set of operational modes corresponds to the updated arrangement and/or to the other factors. If the computing device 200 determines that a different set of operational modes corresponds to the updated arrangement and/or to the other factors, the computing device 200 may then load this different set onto the controllers in accordance with the techniques discussed above.

The above-mentioned changes to the spatial arrangement and/or to the other factors could take on one of various forms. In one example, the change may involve changing the spatial location of one or more controllers so as to result in the updated spatial arrangement. In another example, the change may involve a change of the spatial location of the robotic system 100 (or of a robotic system component) relative to the spatial arrangement. In yet another example, the change may involve a change in respective orientations of one or more of the controllers in the spatial arrangement. In yet another example, the change may involve a change in orientation of the robotic system 100 (or of a robotic system component) relative to respective orientations of controllers in the spatial arrangement. In yet another example, the change may involve addition to of one or more controllers to the arrangement, removal of one or more controllers from the arrangement, and/or replacement of one or more controllers in the arrangement. Other examples are also possible.

In yet another aspect, the various set of operational modes could be predetermined. Additionally or alternatively, a user could customize, add, and/or remove various sets such as via the computing device 200. By way of example, the user could configure the computing device 200 to detect a particular square arrangement of four controllers and then determine a particular set for this square arrangement. Moreover, the user could configure this set by (i) configuring the various operational modes in the set to cause control of different aspects of the robotic system 100 and (ii) selecting corresponding locations in the arrangement for each operational mode such that each operational mode would be loaded to the appropriate controller within the square arrangement.

In yet another aspect, a user could make changes to loaded operational modes once a set of operational modes has already been loaded onto the controllers in the spatial arrangement. For instance, referring back to the example operational modes introduced in FIGS. 8A to 8C, the user could configure the computing device 200 to upload a new operational mode onto controller 300A such that controller 300A then generates output data that is used to determine commands (e.g., by tablet 216) for controlling rotation 802C of the joint J2 about the y-axis. While doing so, the user could also configure the computing device 200 to upload new operational mode onto controller 300C such that controller 300C then generates output data that is used to determine commands (e.g., by tablet 216) for controlling rotation 802A of the joint J2 about the x-axis. Other aspects are also possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method comprising:
    detecting, by a computing device, that a first controller is within at least a threshold distance of a second controller, wherein the first and second controllers are each configurable to operate at least one component of a robotic device;
    in response to at least the detecting, determining a spatial arrangement of the first and second controllers;
    determining a set of operational modes that corresponds to the spatial arrangement, wherein the set comprises at least (i) a first operational mode that corresponds to a first location in the spatial arrangement and (ii) a second operational mode that corresponds to a second location in the spatial arrangement; and
    the computing device loading (i) the first operational mode to whichever of the first and second controllers is in the first location in the spatial arrangement and (ii) the second operational mode to whichever of the first and second controllers is in the second location in the spatial arrangement.

2. The method of claim 1,
    wherein the at least one component comprises a joint of the robotic device,
    wherein the first operational mode corresponds to generation of output data that is used to determine commands for controlling rotation of the joint about a particular axis, and
    wherein the second operational mode corresponds to generation of different output data that is used to determine commands for controlling rotation of the joint about another axis that is different from the particular axis.

3. The method of claim 1,
    wherein the at least one component comprises a joint of the robotic device,
    wherein the first operational mode corresponds to generation of output data that is used to determine commands for controlling translation of the joint along a particular axis, and
    wherein the second operational mode corresponds to generation of different output data that is used to determine commands for controlling translation of the joint along another axis that is different from the particular axis.

4. The method of claim 1,
    wherein the first operational mode corresponds to generation of output data that is used to determine commands for controlling direction of movement of the at least one component, and
    wherein the second operational mode corresponds to generation of different output data that is used to determine commands for controlling speed of movement of the at least one component.

5. The method of claim 1, further in response to the detecting, determining a spatial location of the at least one component relative to the spatial arrangement, wherein determining the set is also based at least in part on the spatial location of the at least one component relative to the spatial arrangement.

6. The method of claim 1, further in response to the detecting, determining respective orientations of the first and second controllers, wherein determining a set of operational modes that corresponds to the spatial arrangement comprises determining a set of operational modes that corresponds to the spatial arrangement and to the respective orientations.

7. The method of claim 6, further in response to the detecting, determining an orientation of the at least one component relative to the respective orientations of the first and second controllers, wherein determining the set is also based at least in part on the orientation of the at least one component relative to the respective orientations of the first and second controllers.

8. The method of claim 1, wherein the first and second controllers each comprises a respective rotatable knob including a respective touchpad arranged to sense touch gestures on a surface of the respective rotatable knob.

9. The method of claim 8,
    wherein the first operational mode corresponds to generation of output data that is indicative of (i) touch data at the respective touchpad of the first controller and (ii) rotation of the respective rotatable knob of the first controller, and
    wherein the second operational mode corresponds to generation of different output data that is indicative of (i) touch data at the respective touchpad of the second controller and (ii) rotation of the respective rotatable knob of the second controller.

10. The method of claim 1, wherein detecting, by a computing device, that a first controller is within at least a threshold distance of a second controller comprises:
    determining a distance between the first and second controllers; and
    determining that the distance is less than a threshold distance.

11. The method of claim 1, wherein detecting, by a computing device, that a first controller is within at least a threshold distance of a second controller comprises:
    receiving, by the computing device, a communication from the first controller, wherein the communication indicates a detection by the first controller that the first controller is within at least a threshold distance of the second controller.

12. A non-transitory computer readable medium having stored therein instructions executable by one or more processors to cause a computing device to perform functions comprising:
    detecting that a first controller is within at least a threshold distance of a second controller, wherein the first and second controllers are each configurable to operate at least one component of a robotic device;
    in response to at least the detecting, determining a spatial arrangement of the first and second controllers;
    determining a set of operational modes that corresponds to the spatial arrangement, wherein the set comprises at least (i) a first operational mode that corresponds to a first location in the spatial arrangement and (ii) a second operational mode that corresponds to a second location in the spatial arrangement; and
    loading (i) the first operational mode to whichever of the first and second controllers is in the first location in the spatial arrangement and (ii) the second operational mode to whichever of the first and second controllers is in the second location in the spatial arrangement.

13. The non-transitory computer readable medium of claim 12,
    wherein the at least one component comprises a joint of the robotic device,
    wherein the first operational mode corresponds to generation of output data that is used to determine commands for controlling rotation of the joint about a particular axis, and wherein the second operational mode corresponds to generation of different output data that is used to determine commands for controlling rotation of the joint about another axis that is different from the particular axis.

14. The non-transitory computer readable medium of claim 12,
wherein the at least one component comprises a joint of the robotic device,
wherein the first operational mode corresponds to generation of output data that is used to determine commands for controlling translation of the joint along a particular axis, and
wherein the second operational mode corresponds to generation of different output data that is used to determine commands for controlling translation of the joint along another axis that is different from the particular axis.

15. The non-transitory computer readable medium of claim 12,
wherein the first operational mode corresponds to generation of output data that is used to determine commands for controlling direction of movement of the at least one component, and
wherein the second operational mode corresponds to generation of different output data that is used to determine commands for controlling speed of movement of the at least one component.

16. The non-transitory computer readable medium of claim 12, further in response to the detecting, determining a spatial location of the at least one component relative to the spatial arrangement, wherein determining the set is also based at least in part on the spatial location of the at least one component relative to the spatial arrangement.

17. The non-transitory computer readable medium of claim 12, further in response to the detecting, determining respective orientations of the first and second controllers, wherein determining a set of operational modes that corresponds to the spatial arrangement comprises determining a set of operational modes that corresponds to the spatial arrangement and to the respective orientations.

18. The non-transitory computer readable medium of claim 12,
wherein the first and second controllers each comprises a respective rotatable knob including a respective touchpad arranged to sense touch gestures on a surface of the respective rotatable knob,
wherein the first operational mode corresponds to generation of output data that is indicative of (i) touch data at the respective touchpad of the first controller and (ii) rotation of the respective rotatable knob of the first controller, and
wherein the second operational mode corresponds to generation of different output data that is indicative of (i) touch data at the respective touchpad of the second controller and (ii) rotation of the respective rotatable knob of the second controller.

19. A computing system comprising:
one or more processors;
a non-transitory computer readable medium; and
program instructions stored on the non-transitory computer readable medium and executable by the one or more processors to:
detect that a first controller is within at least a threshold distance of a second controller, wherein the first and second controllers are each configurable to operate at least one component of a robotic device;
in response to at least the detecting, determine a spatial arrangement of the first and second controllers;
determine a set of operational modes that corresponds to the spatial arrangement, wherein the set comprises at least (i) a first operational mode that corresponds to a first location in the spatial arrangement and (ii) a second operational mode that corresponds to a second location in the spatial arrangement; and
load (i) the first operational mode to whichever of the first and second controllers is in the first location in the spatial arrangement and (ii) the second operational mode to whichever of the first and second controllers is in the second location in the spatial arrangement.

20. The computing system of claim 19,
wherein the at least one component comprises a joint of the robotic device,
wherein the first operational mode corresponds to generation of output data that is used to determine commands for controlling rotation of the joint about a particular axis, and
wherein the second operational mode corresponds to generation of different output data that is used to determine commands for controlling rotation of the joint about another axis that is different from the particular axis.

* * * * *